US011261376B2

(12) United States Patent
Hazu et al.

(10) Patent No.: US 11,261,376 B2
(45) Date of Patent: Mar. 1, 2022

(54) GADOLINIUM OXYSULFIDE SINTERED BODY, AND SCINTILLATOR, SCINTILLATOR ARRAY, RADIATION DETECTOR, AND RADIATION INSPECTION APPARATUS INCLUDING GADOLINIUM OXYSULFIDE SINTERED BODY

(71) Applicant: Mitsubishi Chemical Corporation, Chiyoda-ku (JP)

(72) Inventors: Koji Hazu, Chiyoda-ku (JP); Keiji Yamahara, Chiyoda-ku (JP); Toshiaki Katayama, Chiyoda-ku (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 0 days.

(21) Appl. No.: 16/522,127

(22) Filed: Jul. 25, 2019

(65) Prior Publication Data

US 2019/0345383 A1    Nov. 14, 2019

Related U.S. Application Data

(63) Continuation of application No. PCT/JP2018/003030, filed on Jan. 30, 2018.

(30) Foreign Application Priority Data

Jan. 31, 2017  (JP) .............................. JP2017-015525

(51) Int. Cl.
*C09K 11/77* (2006.01)
*G01T 1/20* (2006.01)

(52) U.S. Cl.
CPC ........ *C09K 11/7771* (2013.01); *G01T 1/2018* (2013.01)

(58) Field of Classification Search
CPC .................................................... G01T 1/2018
See application file for complete search history.

(56) References Cited

U.S. PATENT DOCUMENTS

2014/0301527 A1\* 10/2014 Morimoto ............ G01N 23/046
378/4
2016/0046860 A1\* 2/2016 Wang .................... C04B 35/547
252/301.4 S (Continued)

FOREIGN PATENT DOCUMENTS

CN           1918262 A    2/2007
CN         101663372 A    3/2010

(Continued)

OTHER PUBLICATIONS

English translation of the International Preliminary Report on Patentability and Written Opinion of the International Searching Authority dated Aug. 15, 2019 in PCT/JP2018/003030, 8 pages.

(Continued)

*Primary Examiner* — Edwin C Gunberg
(74) *Attorney, Agent, or Firm* — Oblon, McClelland, Maier & Neustadt, L.L.P.

(57) ABSTRACT

The present invention provides a gadolinium oxysulfide sintered body having a high light output. The problem is resolved by a gadolinium oxysulfide sintered body in which the ratio of the light transmittance $T_{410}$ of 410 nm to the light transmittance $T_{512}$ of 512 nm ($T_{410}/T_{512}$) is from 0.31 to 0.61, or a gadolinium oxysulfide sintered body in which the ratio of the diffraction peak intensity $I_y$ of a phase different from gadolinium oxysulfide appearing at $2\theta$=from 20 to 29° to the diffraction peak intensity ($I_x$) of (102) or (011) of gadolinium oxysulfide appearing at $2\theta$=30°±1° ($I_y/I_x$) is 0.1 or less in an XRD diffraction pattern and which contains one (Continued)

or more activators selected from the group consisting of praseodymium, terbium, and cerium.

14 Claims, 1 Drawing Sheet

(56) References Cited

U.S. PATENT DOCUMENTS

| | | | |
|---|---|---|---|
| 2016/0230085 A1 | 8/2016 | Terazawa et al. | |
| 2017/0199285 A1 | 7/2017 | Adachi et al. | |

FOREIGN PATENT DOCUMENTS

| | | |
|---|---|---|
| CN | 103254900 A | 8/2013 |
| CN | 105764855 A | 7/2016 |
| JP | 6-201834 A | 7/1994 |
| JP | 2002-275465 A | 9/2002 |
| JP | 2015-175538 A | 10/2015 |
| WO | WO 2013/080565 A1 | 6/2013 |
| WO | WO 2015/045870 A1 | 4/2015 |
| WO | WO 2016/047139 A1 | 3/2016 |

OTHER PUBLICATIONS

International Search Report dated Mar. 27, 2018 in PCT/JP2018/003030 filed Jan. 30, 2018.
G.V. Anan'eva, et al., "Optical properties of $Gd_2O_2S$-based ceramic", Journal of Optical Technology, vol. 72, Issue 1, Jan. 2005, pp. 58-61.
Ryouhei Nakamura, et al., "Development of $Gd_2O_2S$: Pr, Ce, F ceramic scintillator for X-ray CT", Memoirs of Shonan Institute of Technology, vol. 35,No. 1, 2001, pp. 19-28 (with English Abstract).
Chinese Office Action and Search Report dated Jun. 11, 2021 issued in corresponding Chinese patent application No. 201880008416.3; (with English machine translation).
Notice of Reasons for Refusal dated Aug. 3, 2021 issued in corresponding Japanese Application No. 2018-585575, (with English translation).
Office Action and Search Report dated Dec. 23, 2021, in Chinese Patent Application No. 201880008416.4 filed Jan. 30, 2018 (with machine generated English translation).
F.H. Atticus et al., "Radiation Dosimetry", Atomic Energy Publishing Co., vol. 2. p. 141 (1981).
H. Yong et al., "Rare Earth Luminescent Materials", Metallurgical Industry Press, pp. 228-229 (2016).
W. Wang et al., "Fabrication of $Gd_2O_2S$:Pr, Ce,F Scintillation Ceramics by Pressureless Sintering in Nitrogen Atmosphere", Int. J. Appl. Ceram. Techol., vol. 12, period S3, pp. E249-E255 (2015).

* cited by examiner

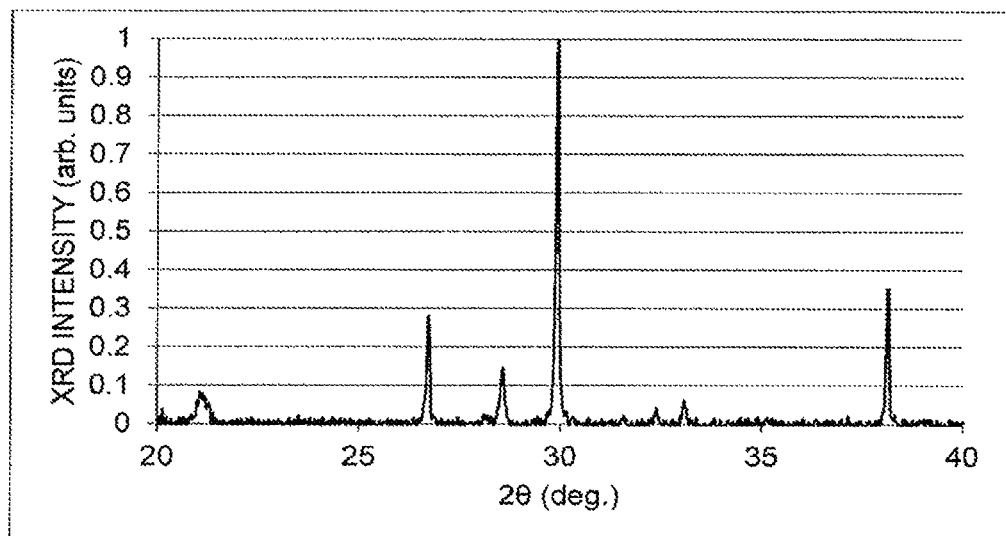

GADOLINIUM OXYSULFIDE SINTERED BODY, AND SCINTILLATOR, SCINTILLATOR ARRAY, RADIATION DETECTOR, AND RADIATION INSPECTION APPARATUS INCLUDING GADOLINIUM OXYSULFIDE SINTERED BODY

CROSS-REFERENCE TO RELATED APPLICATION

This is a continuation of International Application PCT/JP2018/003030, filed on Jan. 30, 2018, and designated the U.S., and claims priority from Japanese Patent Application 2017-015525 which was filed on Jan. 31, 2017, the entire contents of which are incorporated herein by reference.

TECHNICAL FIELD

The present invention relates to a gadolinium oxysulfide sintered body, and a scintillator, a scintillator array, a radiation detector, and a radiation inspection apparatus including a gadolinium oxysulfide sintered body

BACKGROUND OF THE INVENTION

Image diagnosis by X-ray transmission imaging or image diagnosis by X-ray CT (Computed Tomography) imaging is utilized for the purpose of medical diagnosis or industrial nondestructive inspection. In these diagnostic imaging apparatuses, in order to convert X-rays into visible light, a plurality of arrayed ceramic scintillators (scintillator array) each formed of a sintered body of a rare earth oxysulfide such as praseodymium activated gadolinium oxysulfide ($Gd_2O_2S:Pr$) (hereinafter, also referred to as GOS:Pr) is used.

While the resolution of these X-ray diagnostic images can be improved by miniaturizing ceramic scintillators included in the scintillator array, there is a problem that the sensitivity to X-rays decreases. Under such circumstances, in recent years, more sensitive ceramic scintillators are demanded, and for example, Patent Document 1 discloses that decrease in the light output of a scintillator array can be suppressed by adjusting the amount of impurity metal oxide or impurity metal sulfide in a $Gd_2O_2S:Pr$ sintered body.

CITATION LIST

Patent Document

Patent Document 1 WO 2016/047139

SUMMARY OF INVENTION

Technical Problem

However, in Patent Document 1, although a ceramic scintillator is annealed twice in an inert gas atmosphere ($SO_x$ gas) containing oxygen and sulfur to reduce an oxide region and a sulfide region, the rate of temperature rise to the annealing temperature is considerably slow at 50° C./hour or less, and is not industrially excellent including an exhaust gas treatment, and since the heat treatment time is long, an impurity such as sulfur oxide or gadolinium oxide may be generated to reduce the light output.

The present invention has been made in view of the above, and an object thereof is to provide a gadolinium oxysulfide sintered body having a high light output.

Solution to Problem

The present inventors intensively studied to find that a gadolinium oxysulfide sintered body in which the ratio ($T_{410}/T_{512}$) of the light transmittance $T_{410}$ of 410 nm to the light transmittance $T_{512}$ of 512 nm is a specific value, and which contains a specific activator can solve the above problem, and arrived at the present invention.

Although the reason why the problem can be solved by the above configuration is not clear, since the light transmittance at 410 nm is considered to be reduced by absorption due to oxygen or sulfur deficiency, and the light transmittance of 512 nm is considered to be reduced due to emission by 4f-4f transition of Pr and self-absorption, it is presumed that, by adjusting both transmittances to have a specific ratio, gadolinium oxysulfide having high light output could be provided.

Specifically, a gist of the present invention includes a gadolinium oxysulfide sintered body in which the ratio of the light transmittance $T_{410}$ of 410 nm to the light transmittance $T_{512}$ of 512 nm ($T_{410}/T_{512}$) is from 0.31 to 0.61 and which contains one or more activators selected from the group consisting of praseodymium, terbium, and cerium.

A gist of the present invention also includes a gadolinium oxysulfide sintered body in which the ratio of the diffraction peak intensity $I_y$ of a phase different from gadolinium oxysulfide appearing at 2θ=from 20 to 29° to the diffraction peak intensity ($I_x$) of (102) or (011) of gadolinium oxysulfide appearing at 2θ=30°±1° ($I_y/I_x$) is 0.1 or less in an XRD diffraction pattern and which contains one or more activators selected from the group consisting of praseodymium, terbium, and cerium.

A gist of the present invention also includes a method of manufacturing a gadolinium oxysulfide sintered body, including: a sintering step of sintering gadolinium oxysulfide phosphor powder and obtaining the gadolinium oxysulfide sintered body; and an annealing step of heat treating the obtained sintered body at from 900° C. to 1,150° C. in an inert gas atmosphere in a state of being in contact with gadolinium oxysulfide.

A gist of the present invention also includes a scintillator including the gadolinium oxysulfide sintered body, a scintillator array including the scintillator, a radiation detector including the scintillator or the scintillator array, or a radiation inspection apparatus including the radiation detector.

Advantageous Effects of Invention

According to the present invention, it is possible to provide a gadolinium oxysulfide sintered body having a high light output.

According to the present invention, it is possible to provide a scintillator having a high light output, which contains the gadolinium oxysulfide sintered body.

According to the present invention, it is possible to provide a scintillator array having a high light output, including the scintillator.

According to the present invention, it is possible to provide a radiation detector that is highly sensitive to X-rays, including a photodetector and the scintillator or scintillator array.

Furthermore, according to the present invention, it is possible to provide a radiation inspection apparatus capable of imaging an X-ray image with an excellent S/N ratio.

BRIEF DESCRIPTION OF THE DRAWING

The drawing is an X-ray diffraction spectrum of a sintered body obtained in Example 2.

DESCRIPTION OF THE PREFERRED EMBODIMENTS

Hereinafter, the present invention will be described with reference to embodiments and Examples, but the present invention is not limited to the following Embodiments, Examples, and the like, and can be arbitrarily modified and implemented without departing from the gist of the present invention.

Herein, a numerical range expressed using "to" means a range including numerical values described before and after "to" as a lower limit value and an upper limit value.

<Gadolinium Oxysulfide Sintered Body>

The gadolinium oxysulfide sintered body according to a first embodiment of the present invention is a gadolinium oxysulfide sintered body in which the ratio of the light transmittance $T_{410}$ of 410 nm to the light transmittance $T_{512}$ of 512 nm ($T_{410}/T_{512}$) is from 0.31 to 0.61 and which contains one or more activators selected from the group consisting of praseodymium, terbium, and cerium.

(Constituent Elements of Gadolinium Oxysulfide Sintered Body)

The gadolinium oxysulfide sintered body has a basic structure of $Gd_2O_2S$, and contains one or more selected from the group consisting of praseodymium (Pr), terbium (Tb), and cerium (Ce) as an activator. Among these, praseodymium (Pr) is preferable from the viewpoint of improving the afterglow characteristics.

The content of the activator in the gadolinium oxysulfide sintered body is not particularly limited, and is relative to $Gd_2O_2S$, usually 100 wtppm or more, preferably 200 wtppm or more, more preferably 300 wtppm or more, and still more preferably 500 wtppm or more, and usually 2,000 wtppm or less, preferably 1,500 wtppm or less, more preferably 1,300 wtppm or less, and still more preferably 1,000 wtppm or less.

Within the above range, the light output of a scintillator can be increased.

The gadolinium oxysulfide sintered body may contain another lanthanoid as an activator in addition to praseodymium, terbium, and cerium. The gadolinium oxysulfide sintered body may contain a halogen element such as fluorine, chlorine, bromine, or iodine within a range in which an effect of the present invention is exhibited.

(Light Transmittance of Gadolinium Oxysulfide Sintered Body)

In a gadolinium oxysulfide sintered body, the ratio ($T_{410}/T_{512}$) of the light transmittance $T_{410}$ of 410 nm to the light transmittance $T_{512}$ of 512 nm is 0.61 or less, and may be 0.30 or more, preferably 0.31 or more, more preferably 0.32 or more, still more preferably 0.33 or more, particularly preferably 0.35 or more, and most preferably 0.38 or more. When $T_{410}/T_{512}$ is out of the above range, sufficient light output may not be obtained.

Example of a method in which $T_{410}/T_{512}$ of a gadolinium oxysulfide sintered body is set in the above-described range include: a method of sintering under conditions that can obtain sufficient density to suppress scattering or annealing under conditions of reducing defect density; and a method of containing praseodymium or cerium as an activator.

The light transmittance of a gadolinium oxysulfide sintered body was measured by U-3310 manufactured by Hitachi High-Tech Science Company. A 6×6×3 mm thick sample was fixed to a black jig with 1 mmφ pinhole with a transparent tape, and the black jig to which the sample was fixed was brought into close contact with the integrating sphere in such a manner that the pinhole was at the center of incident light of U-3310, and the total light transmittance was measured.

(XRD Diffraction Pattern of Gadolinium Oxysulfide Sintered Body)

In the gadolinium oxysulfide sintered body according to a second embodiment of the present invention, the ratio of the diffraction peak intensity $I_y$ of a phase different from gadolinium oxysulfide appearing at 2θ=from 20 to 29° to the diffraction peak intensity ($I_x$) of (102) or (011) of gadolinium oxysulfide appearing at 2θ=30°±1° ($I_y/I_x$) is, in an XRD diffraction pattern, usually 0.1 or less, preferably 0.095 or less, more preferably 0.09 or less, still more preferably 0.085 or less, and particularly preferably 0.08 or less, and the lower limit is usually larger than 0.

$I_y/I_x$ in the above range is preferable since there are few non-light emitting components and GOS absorbs X-rays more and contributes to light emission.

Examples of a method of setting the value of $I_y/I_x$ of a gadolinium oxysulfide sintered body to the above range include annealing under an appropriate oxygen concentration.

The $I_y/I_x$ of a gadolinium oxysulfide sintered body was measured by placing a sample in a form of a non-reflecting plate using X'Pert manufactured by PHILIPS Company. For the X-ray diffraction pattern, background was removed by X'PertHighScore and then processed for K-Alpha 2 separation. Since the diffraction peak angle fluctuates due to the adjustment of an apparatus and a goniometer, distortion of a sintered body, or the like, the main diffraction peak does not necessarily appear at 30°. When there are a plurality of diffraction peaks of a phase different from gadolinium oxysulfide appearing at 20 to 29°, the one with the highest peak intensity is taken as $I_y$.

(Density of Gadolinium Oxysulfide Sintered Body)

A gadolinium oxysulfide sintered body has a density of usually 99.0% or more, preferably 99.2% or more, more preferably 99.4% or more, still more preferably 99.5% or more, and particularly preferably 99.6% or more.

When the density is in the above range, scattering by voids is suppressed and absorption in the sintered body is reduced, which is preferable.

Examples of a method of increasing the density of a gadolinium oxysulfide sintered body include a method such as use of a suitable sintering aid.

The density of a gadolinium oxysulfide sintered body can be calculated by measuring the sintered body of 6×6×3 mm four times using an analytical balance AUW220D manufactured by Shimadzu Corporation and a specific gravity measurement kit SMK-401, and averaging second to fourth measured values.

<Method of Manufacturing Gadolinium Oxysulfide Sintered Body>

The method of manufacturing a gadolinium oxysulfide sintered body is not particularly limited, and is preferably a method of manufacturing a gadolinium oxysulfide sintered body including a sintering step of sintering gadolinium oxysulfide phosphor powder and preparing a sintered body of gadolinium oxysulfide and an annealing step of heat treatment at 900° C. or more and 1,100° C. or less in an inert gas atmosphere in a state in which the sintered body obtained in the above step is in contact with gadolinium oxysulfide (another aspect of the present invention).

(Sintering Step)

The sintering step is a step of sintering a gadolinium oxysulfide phosphor powder (for example, GOS:Pr) and preparing a sintered body of the gadolinium oxysulfide.

Gadolinium oxysulfide phosphor powder used as raw material is not particularly limited as long as the powder contains one or more selected from the group consisting of Pr, Tb, and Ce as an activator, and may be a commercially available one, or those described in JP 03-192187 A and JP 09-63122 A may be used.

Other than GOS:Pr, GOS:Pr, Ce further containing cerium (Ce), GOS:Tb containing terbium (Tb), GOS:Ce containing cerium (Ce), and the like can be used singly or in combination.

The volume-based average particle diameter of gadolinium oxysulfide phosphor powder used as the raw material is usually 0.1 µm or more, preferably 0.5 µm or more, more preferably 1.0 µm or more, still more preferably 1.5 µm or more, and particularly preferably 2.5 µm or more, and usually 30 µm or less, preferably 20 µm or less, more preferably 15 µm or less, and still more preferably 10 µm or less.

The average particle diameter is preferably in the above range from the viewpoint of reducing voids after sintering.

Next, the above gadolinium oxysulfide phosphor powder is sintered, and a sintered body of gadolinium oxysulfide to be a constituent material of a ceramic scintillator is prepared. When sintering gadolinium oxysulfide phosphor powder, a known sintering method such as hot pressing or HIP (see JP 2002-275465 A, WO 2016/047139, or the like), reactive sintering, or the like can be applied, and in particular, since it is possible to easily obtain a high density gadolinium oxysulfide sintered body, it is preferable to apply an HIP method to carry out a sintering step.

A sintering step to which an HIP method is applied is carried out by first forming a gadolinium oxysulfide phosphor powder into a suitable shape, then filling and sealing in a metal container or the like, and performing the HIP step.

The temperature of HIP is usually 2,000° C. or less, preferably 1,800° C. or less, more preferably 1,600° C. or less, still more preferably 1,500° C. or less, and particularly preferably 1,400° C. or less, and is usually 800° C. or more, preferably 900° C. or more, more preferably 950° C. or more, still more preferably 1,000° C. or more, and particularly preferably 1,050° C. or more.

The pressure for HIP is usually 200 MPa or less, preferably 180 MPa or less, more preferably 160 MPa or less, still more preferably 150 MPa or less, and particularly preferably 140 MPa or less, and is usually 50 MPa or more, preferably 60 MPa or more, more preferably 70 MPa or more, still more preferably 80 MPa or more, and particularly preferably 90 MPa or more.

The time for HIP is usually 48 hours or less, preferably 36 hours or less, more preferably 24 hours or less, more preferably 12 hours or less, and particularly preferably 10 hours or less, and is usually 0.5 hours or more, preferably 0.8 hours or more, more preferably 1 hour or more, more preferably 1.5 hours or more, and particularly preferably 2 hours or more.

Typically, by performing an HIP step under the above conditions, a gadolinium oxysulfide sintered body is obtained.

The sintering step may optionally include a pretreatment step (step of washing, drying, vacuum degassing, and the like), a post-treatment step (step of washing, drying, and the like), and the like.

(Annealing Step)

The annealing step is a step of heat treating the gadolinium oxysulfide sintered body obtained in the above-described sintering step at from 900° C. to 1,150° C. in an inert gas atmosphere.

By adjusting the temperature, time, and atmosphere of the annealing step in such a manner that sulfate does not form on the surface of the gadolinium oxysulfide sintered body, a gadolinium oxysulfide sintered body having a specific light transmittance can be obtained.

It is preferable to cut out a gadolinium oxysulfide sintered body into a desired shape and size by a blade saw, a wire saw, or the like before the annealing step.

The annealing step is performed in an inert gas atmosphere such as argon gas or nitrogen. Among these, it is preferable to carry out under industrial argon or nitrogen gas from the viewpoint of suppression of production cost.

The flow rate of the inert gas is not particularly limited, and is preferably from 0.1 L/min to 20 L/min.

The heat treatment temperature is usually 900° C. or more, preferably 950° C. or more, more preferably 1,000° C. or more, more preferably 1,050° C. or more, and is usually 1,150° C. or less, preferably 1,140° C. or less, more preferably 1,100° C. or less.

The heat treatment time is usually 8 hours or more, preferably 8.5 hours or more, more preferably 9 hours or more, and still more preferably 9.5 hours or more, and is usually 19 hours or less, preferably 17 hours or less, and more preferably 15 hours or less.

The annealing step is preferably performed in an inert gas atmosphere and in a state in which gadolinium oxysulfide powder is in contact with a sintered body. By bringing the gadolium oxysulfide powder and the sintered body into contact in the annealing step, a gadolium sulfide sintered body having high brightness can be obtained.

When manufacturing a gadolinium oxysulfide sintered body, an optional step may be included in addition to the above steps.

<Scintillator>

Another aspect of the present invention is a scintillator, which is not particularly limited as long as it contains a gadolinium oxysulfide sintered body according to the embodiment, and may be one in which a gadolinium oxysulfide sintered body is used as it is or one obtained by processing a gadolinium oxysulfide sintered body into an arbitrary shape.

A scintillator may have a reflective layer on the surface of a gadolinium oxysulfide sintered body in order to allow scintillation light to reach a detector without leakage.

Examples of the reflective layer include those containing inorganic particles such as $TiO_2$, $Al_2O_3$, or ZnO and a binder resin.

The thickness of the reflective layer is usually 0.01 µm or more, preferably 0.05 µm or more, more preferably 0.1 µm or more, and still more preferably 0.15 µm or more, and is usually 10,000 µm or less, preferably 1,000 µm or less, more preferably 500 µm or less, and still more preferably 300 µm or less. When the thickness is in the above range, light emitted by a sintered body can efficiently reach a light receiving surface.

<Scintillator Array>

Another aspect of the present invention is a scintillator array, which preferably includes a plurality of the above-described scintillators, and includes a reflective layer and/or a gap between the scintillators. Scintillator arrays can also be used at lower X-ray doses.

<Radiation Detector>

Another aspect of the present invention is a radiation detector, which includes a photodetector and the above described scintillator or scintillator array.

The photodetector includes a photoelectric conversion unit facing a scintillator or scintillator array, and has a function of converting fluorescence emitted from the scintillator or scintillator array into an electrical signal or the like. The photodetector is not particularly limited as long as the photodetector has such a function, and a known photodetector can be used as appropriate.

<Radiation Inspection Apparatus>

An example of the radiation inspection apparatus is an X-ray CT apparatus. The X-ray CT apparatus includes an X-ray irradiation unit that irradiates X-rays to a subject, an X-ray measurement unit facing the X-ray irradiation unit via the subject and measures the number of transmitted X-rays in a specific energy range according to a test object inside the subject among X-rays transmitted through the subject, a thickness computation unit that computes the thickness of the test object based on the number of transmitted X-rays measured by the X-ray measurement unit, and an image reconstruction unit that reconstructs a CT image based on the thickness of the test object computed by the thickness computation unit.

EXAMPLES

Hereinafter, the present invention will be more specifically described by way of Examples. However, the present invention is not limited to the following Examples without departing from the scope of the invention.

[Preparation of Radiation Image Conversion Screen]

Example 1

Sintering Step

Powder of $Gd_2O_2S$:Pr phosphor having an average particle diameter of 9 μm based on volume was enclosed in a mild steel capsule and subjected to HIP treatment at a temperature of 1,300° C. for 2 hours under a pressure of 100 MPa, and a sintered body of $Gd_2O_2S$:Pr was obtained.

Next, the obtained sintered body was processed to a thickness of 6×6×3 mm with a dicing saw, and a sintered body piece was obtained.

Annealing Step

The obtained sintered body piece was placed in $Gd_2O_2S$:Pr phosphor powder, arranged in a crucible made of alumina in a state in which the sintered body piece and $Gd_2O_2S$:Pr phosphor powder were in contact, and the crucible was placed in a Tammann furnace SUPER-BURN manufactured by Motoyama Corporation. The temperature was raised to 1,100° C. at 200° C./hour in an argon gas (0.3 L/min) atmosphere and heat treatment was performed for 10 hours, and then the temperature was lowered at 200° C./hour, and a $Gd_2O_2S$:Pr sintered body after an annealing step was obtained.

Measurement of Light Transmittance

The light transmittance was measured by U-3310 manufactured by Hitachi High-Tech Science Corporation. A 6×6×3 mm thick sintered body coated with 100 μm of a reflective material TW-40 manufactured by KOKUYO Co., Ltd. on the side was fixed to a black jig with 1 mmφ pinhole using a transparent tape in such a manner that the 6 mm surface was an incident surface. The black jig with the fixed sintered body was placed in close contact with an integrating sphere in such a manner that the pinhole was located at the center of an incident light of the U-3310, and the transmittance of the sintered body was measured.

Measurement of Light Output (Brightness)

A 100 μm thick reflective material TW-40 manufactured by KOKUYO Co., Ltd. was applied to a sintered body on five surfaces other than a light extraction surface (6×6 mm), PORTA 100HF manufactured by JOB CORPORATION was set to 80 kV 12 mAs, a 10 cm phantom was placed, and the light output was measured using a RadEye Image Sensor at a distance of 750 mm.

The light output is a relative intensity with the light output of DRZ-high manufactured by Mitsubishi Chemical Corporation measured under the same conditions as 1.

Measurement of XRD

A sample was placed on a non-reflecting plate and measured using X-Pert manufactured by PHILIPS Company. For the X-ray diffraction pattern, background was removed by X'PertHighScore and then processed for K-Alpha 2 separation. The X-ray source is CuKα.

Table 1 shows the annealing step conditions of the sintered body obtained in Example 1, and Table 2 shows the light output and the light transmittance before and after annealing, the light output increase rate, the transmittance, $T_{410}/T_{512}$, and $I_y/I_x$.

Examples 2 to 4, Comparative Examples 1 to 2)

A $Gd_2O_2S$:Pr sintered body was obtained using the sintered body piece obtained in Example 1 in the same manner as in Example 1 except that the temperature of the annealing step, the time of the annealing step, and the atmosphere of the annealing step were changed as shown in Table 1.

TABLE 1

| | Annealing step condition | | |
|---|---|---|---|
| | Temperature | Time | Atmosphere |
| Example 1 | 1,100 | 10 | Ar atmosphere, in contact with GOS powder |
| Example 2 | 1,050 | 10 | Ar atmosphere, in contact with GOS powder |
| Example 3 | 1,000 | 10 | Ar atmosphere, in contact with GOS powder |
| Example 4 | 900 | 10 | Ar atmosphere, in contact with GOS powder |
| Comparative Example 1 | 1,300 | 10 | Ar atmosphere, in contact with GOS powder |
| Comparative Example 2 | 1,200 | 10 | Ar atmosphere, in contact with GOS powder |

TABLE 2

| | Before annealing | | After annealing | | Light output increase rate (%) | $T_{410}/T_{512}$ | $I_y/I_x$ |
|---|---|---|---|---|---|---|---|
| | Light output | Transmittance | Light output | Transmittance | | | |
| Example 1 | 0.13 | 8.2 | 0.48 | 19.0 | 355 | 0.46 | 0.042 |
| Example 2 | 0.13 | 7.6 | 0.49 | 21.1 | 374 | 0.43 | 0.078 |
| Example 3 | 0.13 | 9.5 | 0.46 | 24.7 | 344 | 0.32 | — |
| Example 4 | 0.13 | 10.0 | 0.45 | 20.1 | 345 | 0.42 | — |
| Comparative Example 1 | 0.14 | 7.9 | 0.17 | 10.9 | 125 | 0.68 | — |
| Comparative Example 2 | 0.13 | 9.8 | 0.29 | 16.3 | 216 | 0.66 | — |

Example 5

Sintering Step

A sintered body piece was obtained in the same manner as in Example 1.

Annealing Step

The obtained sintered body piece was placed in $Gd_2O_2S$:Pr phosphor powder, arranged in a crucible made of alumina in a state in which the sintered body piece and $Gd_2O_2S$:Pr phosphor powder were in contact, and the crucible was placed in a Tammann furnace SUPER-BURN manufactured by Motoyama Corporation. The temperature was raised to 1,050° C. at 200° C./hour in an argon gas (0.3 L/min) atmosphere and heat treatment was performed for 10 hours, and then the temperature was lowered at 200° C./hour, and a $Gd_2O_2S$:Pr sintered body after an annealing step was obtained.

The annealing step conditions of the sintered body obtained in Example 5, light output after annealing, transmittance, $T_{410}/T_{512}$, and $I_y/I_x$ are shown in Table 3.

Comparative Examples 3 to 7

A $Gd_2O_2S$:Pr sintered body was obtained using the sintered body piece obtained in Example 5 in the same manner as in Example 5 except that the time for the annealing step and the atmosphere in the annealing step were changed as shown in Table 3.

In Comparative Examples 5 and 7, in a crucible, the sintered body piece and $Gd_2O_2S$:Pr phosphor powder were allowed to coexist, and an annealing step was performed in a state in which the sintered body piece was not in contact with the phosphor powder. In Comparative Example 6, as in Comparative Example 5, $Gd_2O_2S$:Pr phosphor powder and the sintered body piece were not in contact with each other, and the annealing step was performed in a state in which the sintered body piece and an alumina crucible were in contact with each other.

The light output, transmittance $T_{410}/T_{512}$, $I_y/I_x$ after annealing of the sintered bodies obtained in Comparative Examples 3 to 7 are shown in Table 3.

TABLE 3

| | $T_{410}/T_{512}$ | $I_y/I_x$ | Light output | Annealing step condition | | |
|---|---|---|---|---|---|---|
| | | | | Temperature | Time | Atmosphere |
| Example 5 | 0.57 | 0.017 | 0.5 | 1,050 | 10 | Ar atmosphere, in contact with GOS powder |
| Comparative Example 3 | 0.08 | 122.156 | 0.23 | 1,050 | 10 | Under the atmosphere |
| Comparative Example 4 | 0.30 | 2.526 | 0.47 | 1,050 | 10 | Nitrogen atmosphere |
| Comparative Example 5 | 0.23 | 0.195 | 0.42 | 1,050 | 10 | Nitrogen atmosphere, not in contact with GOS powder |
| Comparative Example 6 | 0.27 | 0.171 | 0.41 | 1,050 | 10 | Nitrogen atmosphere, not in contact with GOS powder, and in contact with alumina crucible |
| Comparative Example 7 | 0.19 | 0.741 | 0.43 | 1,050 | 24 | Nitrogen atmosphere, not in contact with GOS powder |

From the results of Tables 2 and 3, it was found that the $Gd_2O_2S$:Pr sintered bodies having a transmittance $T_{410}/T_{512}$ of from 0.31 to 0.61 has a high light output and is useful as a scintillator. It was found that a $Gd_2O_2S$:Pr sintered body having an $I_y/I_x$ of 0.1 or less has a high light output and is useful as a scintillator.

What is claimed is:

1. A gadolinium oxysulfide sintered body in which the ratio of the light transmittance $T_{410}$ of 410 nm to the light transmittance $T_{512}$ of 512 nm ($T_{410}/T_{512}$) is from 0.31 to 0.61 and which contains one or more activators selected from the group consisting of praseodymium, terbium, and cerium.

2. A gadolinium oxysulfide sintered body in which the ratio of the diffraction peak intensity $I_y$ of a phase different from gadolinium oxysulfide appearing at 2θ=from 20 to 29° to the diffraction peak intensity ($I_x$) of (102) or (011) of gadolinium oxysulfide appearing at 2θ:=30°±1° ($I_y/I_x$) is 0.1 or less in an XRD diffraction pattern and which contains one or more activators selected from the group consisting of praseodymium, terbium, and cerium.

3. A scintillator comprising the gadolinium oxysulfide sintered body according to claim 1.

4. A scintillator array comprising the scintillators according to claim 3, and comprising a reflective layer between the scintillators.

5. A radiation detector comprising: a photodetector, and the scintillator according to claim 3.

6. A radiation detector comprising: a photodetector; and the scintillator array according to claim 4.

7. A radiation inspection apparatus comprising the radiation detector according to claim 6.

8. A scintillator comprising the gadolinium oxysulfide sintered body according to claim 2.

9. A scintillator array comprising the scintillators according to claim 8, and comprising a reflective layer between the scintillators.

10. A radiation detector comprising: a photodetector; and the scintillator according to claim 8.

11. A radiation detector comprising: a photodetector; and the scintillator array according to claim 9.

12. A radiation inspection apparatus comprising the radiation detector according to claim 11.

13. A method of manufacturing a gadolinium oxysulfide sintered body, comprising:
    sintering a gadolinium oxysulfide phosphor powder to obtain a gadolinium oxysulfide sintered body; and
    annealing the obtained sintered body at from 900° C. to 1,150° C. in an inert gas atmosphere and in a state of being in contact with a gadolinium oxysulfide powder.

14. The method according to claim 13, wherein the inert gas atmosphere is argon.

* * * * *

UNITED STATES PATENT AND TRADEMARK OFFICE
CERTIFICATE OF CORRECTION

PATENT NO. : 11,261,376 B2
APPLICATION NO. : 16/522127
DATED : March 1, 2022
INVENTOR(S) : Koji Hazu et al.

Page 1 of 1

It is certified that error appears in the above-identified patent and that said Letters Patent is hereby corrected as shown below:

In the Claims

In Column 11, Line 8, Claim 2, delete "2θ:" and insert -- 2θ --, therefor.

Signed and Sealed this
Twenty-first Day of June, 2022

Katherine Kelly Vidal
*Director of the United States Patent and Trademark Office*